US010524167B2

(12) United States Patent
Yoon et al.

(10) Patent No.: US 10,524,167 B2
(45) Date of Patent: Dec. 31, 2019

(54) HANDOVER METHOD AND DEVICE OF TERMINAL IN MOBILE COMMUNICATION SYSTEM

(71) Applicant: Samsung Electronics Co., Ltd., Suwon-si, Gyeonggi-do (KR)

(72) Inventors: Taiho Yoon, Yongin-si (KR); Indae Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 15/302,375

(22) PCT Filed: Apr. 13, 2015

(86) PCT No.: PCT/KR2015/003682
§ 371 (c)(1),
(2) Date: Oct. 6, 2016

(87) PCT Pub. No.: WO2015/156655
PCT Pub. Date: Oct. 15, 2015

(65) Prior Publication Data
US 2017/0034748 A1 Feb. 2, 2017

(30) Foreign Application Priority Data
Apr. 11, 2014 (KR) .................. 10-2014-0043624

(51) Int. Cl.
*H04W 36/02* (2009.01)
*H04W 36/00* (2009.01)
(Continued)

(52) U.S. Cl.
CPC ....... *H04W 36/0033* (2013.01); *H04W 36/08* (2013.01); *H04W 74/0841* (2013.01); *H04W 76/27* (2018.02)

(58) Field of Classification Search
None
See application file for complete search history.

(56) References Cited

U.S. PATENT DOCUMENTS 8,543,114 B2    9/2013  Hallenstaal et al.
2005/0025105 A1*  2/2005  Rue .................... H04L 47/14
                                            370/338
(Continued)

FOREIGN PATENT DOCUMENTS

CN     101102598 A    1/2008
EP     1871128 A1    12/2007
(Continued)

OTHER PUBLICATIONS

"Feasibility Study for Evolved UTRA and UTRAN (Release 7)", "3GPP TR 25.912 V0.1.7", pp. 36-40, Jun. 2006 (Year: 2006).*
(Continued)

*Primary Examiner* — Gregory B Sefcheck
*Assistant Examiner* — Jenkey Van
(74) *Attorney, Agent, or Firm* — Jefferson IP Law, LLP

(57) ABSTRACT

Provided is a method for a base station to support handover of a terminal in a mobile communication system. The method may include: receiving a random access preamble from the terminal; transmitting packets stored for the terminal to the terminal; and receiving a handover complete message from the terminal, wherein transmission of the stored packets to the terminal is initiated before receiving the handover complete message. In a feature of the present invention, when a terminal receiving data from the source base station is handed over to the target base station, it is possible to more rapidly transmit the terminal data forwarded to the target base station to the handed over terminal. Hence, user convenience can be enhanced.

12 Claims, 9 Drawing Sheets

(51) Int. Cl.
*H04W 76/27* (2018.01)
*H04W 36/08* (2009.01)
*H04W 74/08* (2009.01)

(56) References Cited

U.S. PATENT DOCUMENTS

| | | | | |
|---|---|---|---|---|
| 2008/0318573 | A1* | 12/2008 | Kaminski | H04W 36/02 |
| | | | | 455/436 |
| 2009/0191875 | A1 | 7/2009 | Vujcic et al. | |
| 2009/0316642 | A1* | 12/2009 | Yamada | H04W 56/0005 |
| | | | | 370/329 |
| 2010/0040022 | A1 | 2/2010 | Lindstrom et al. | |
| 2010/0111032 | A1 | 5/2010 | Wu | |
| 2011/0002304 | A1* | 1/2011 | Lee | H04W 36/02 |
| | | | | 370/331 |
| 2011/0188476 | A1 | 8/2011 | Ootani | |
| 2012/0302240 | A1* | 11/2012 | Tamaki | H04W 36/0011 |
| | | | | 455/436 |
| 2012/0314690 | A1 | 12/2012 | Xu et al. | |
| 2013/0301611 | A1* | 11/2013 | Baghel | H04W 72/04 |
| | | | | 370/331 |
| 2014/0092866 | A1* | 4/2014 | Teyeb | H04W 36/24 |
| | | | | 370/331 |
| 2015/0181493 | A1 | 6/2015 | Park et al. | |
| 2016/0157148 | A1* | 6/2016 | Kato | H04W 36/0055 |
| | | | | 455/444 |
| 2017/0094687 | A1* | 3/2017 | Kato | H04W 74/0833 |

FOREIGN PATENT DOCUMENTS

| | | |
|---|---|---|
| JP | 2009-542063 A | 11/2009 |
| WO | 2007/052922 A1 | 5/2007 |
| WO | 2010/035835 A2 | 4/2010 |
| WO | 2014-017838 A1 | 1/2014 |

OTHER PUBLICATIONS

3GPP TS 36.300 V12.1.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Sgage 2 (Release 12), Mar. 2014.
Ericsson et al., LTE Performance verification—Handover latency, 3GPP TSG-RAN WG2 #58, Tdoc R2-071811, XP050134708, May 7-11, 2007, pp. 1-4, Kobe, Japan.
Extended European Search Report dated Nov. 20, 2017, issued in European Patent Application No. 15776399.6.
Japanese Office Action dated Feb. 25, 2019, issued in Japanese Application No. 2016-561769.
Chinese Office Action dated Mar. 20, 2019, issued in Chinese Application No. 201580030082.7.
Ericsson (rapporteur), Report on discussions on user-plane behavior at RRC re-establishment, 3GPP, TS G-RAN WG2#64, R2-086397, Nov. 14, 2008.

* cited by examiner

HANDOVER METHOD AND DEVICE OF TERMINAL IN MOBILE COMMUNICATION SYSTEM

TECHNICAL FIELD

Embodiments of the present invention relate to a method and apparatus for handover of a terminal in a mobile communication system. More particularly, the present invention relates to a method and apparatus that maintain the quality of service when a user equipment (UE) receiving a service such as a voice call from one base station is handed over to a neighboring base station.

BACKGROUND ART

As wireless communication technologies have rapidly advanced in recent years, communication systems have undergone drastic changes. Currently, the LTE system is in the spotlight as a fourth generation (4G) mobile communication technology. The LTE system supports not only basic handover between different cells (which have been supported by earlier generation communication technologies) but also extended types of handover according to various scenarios.

Handover (or handoff) refers to the process of transferring the user's connection from one base station to another base station while maintaining ongoing call and data sessions. That is, handover may occur when a user equipment (UE) receiving a call service moves from the cell boundary of the current base station to the cell boundary of a neighboring base station. The base station providing a communication channel to the UE before handover may be referred to as a source cell or source base station, and the base station providing a communication channel to the UE after handover may be referred to as a target cell or target base station. That is, the UE communicates through the source cell before handover and communicates through the target cell after handover.

In an existing communication system, when a handover event occurs as to a UE, the source base station forwards data for the UE to the target base station, and the target base station transmits the forwarded data to the UE after the UE is connected to the target base station. In such a situation, it takes time to transmit, receive and interpret messages until the data forwarded to the target base station is transmitted to the UE. This may degrade user convenience. Hence, it is necessary to reduce the time required to transmit the forwarded data.

DISCLOSURE OF INVENTION

Technical Problem

Embodiments of the present invention have been made in view of the above problem. Accordingly, an aspect of the present invention is to provide a method and apparatus that enable, when a user equipment performs handover, the target base station to more rapidly transmit handover data to the user equipment. More specifically, an aspect of the present invention is to provide a method and apparatus that enable, when a UE receiving a service such as a voice call is handed over to a neighboring base station, the UE data forwarded to the neighboring base station to be more rapidly transmitted to the handed over UE.

Solution to Problem

In accordance with an aspect of the present invention, there is provided a method for a base station to support handover of a terminal in a mobile communication system. The method may include: receiving a random access preamble from the terminal; transmitting packets stored for the terminal to the terminal; and receiving a handover complete message from the terminal, wherein transmission of the stored packets to the terminal is initiated before receiving the handover complete message.

In accordance with another aspect of the present invention, there is provided a method for handover of a terminal in a mobile communication system. The method may include: sending a random access preamble to a base station; receiving packets stored for the terminal from the base station; and sending a handover complete message to the base station, wherein transmission of the stored packets to the terminal is initiated before the handover complete message is received by the base station.

In accordance with another aspect of the present invention, there is provided a base station supporting handover of a terminal in a mobile communication system. The base station may include: a transceiver unit to send and receive signals to and from the terminal; and a control unit to control the transceiver unit and to control a process of receiving a random access preamble from the terminal, transmitting packets stored for the terminal to the terminal, and receiving a handover complete message from the terminal, wherein transmission of the stored packets to the terminal is initiated before receiving the handover complete message.

In accordance with another aspect of the present invention, there is provided a terminal capable of handover in a mobile communication system. The user equipment may include: a transceiver unit to send and receive signals to and from a base station; and a control unit to control the transceiver unit and to control a process of sending a random access preamble to the base station, receiving packets stored for the terminal from the base station, and sending a handover complete message to the base station, wherein transmission of the stored packets to the terminal is initiated before the handover complete message is received by the base station.

Advantageous Effects of Invention

In a feature of the present invention, when a terminal receiving data from the source base station is handed over to the target base station, it is possible to more rapidly transmit the terminal data forwarded to the target base station to the handed over terminal. Hence, user convenience can be enhanced.

MODE FOR THE INVENTION

Figure 1:
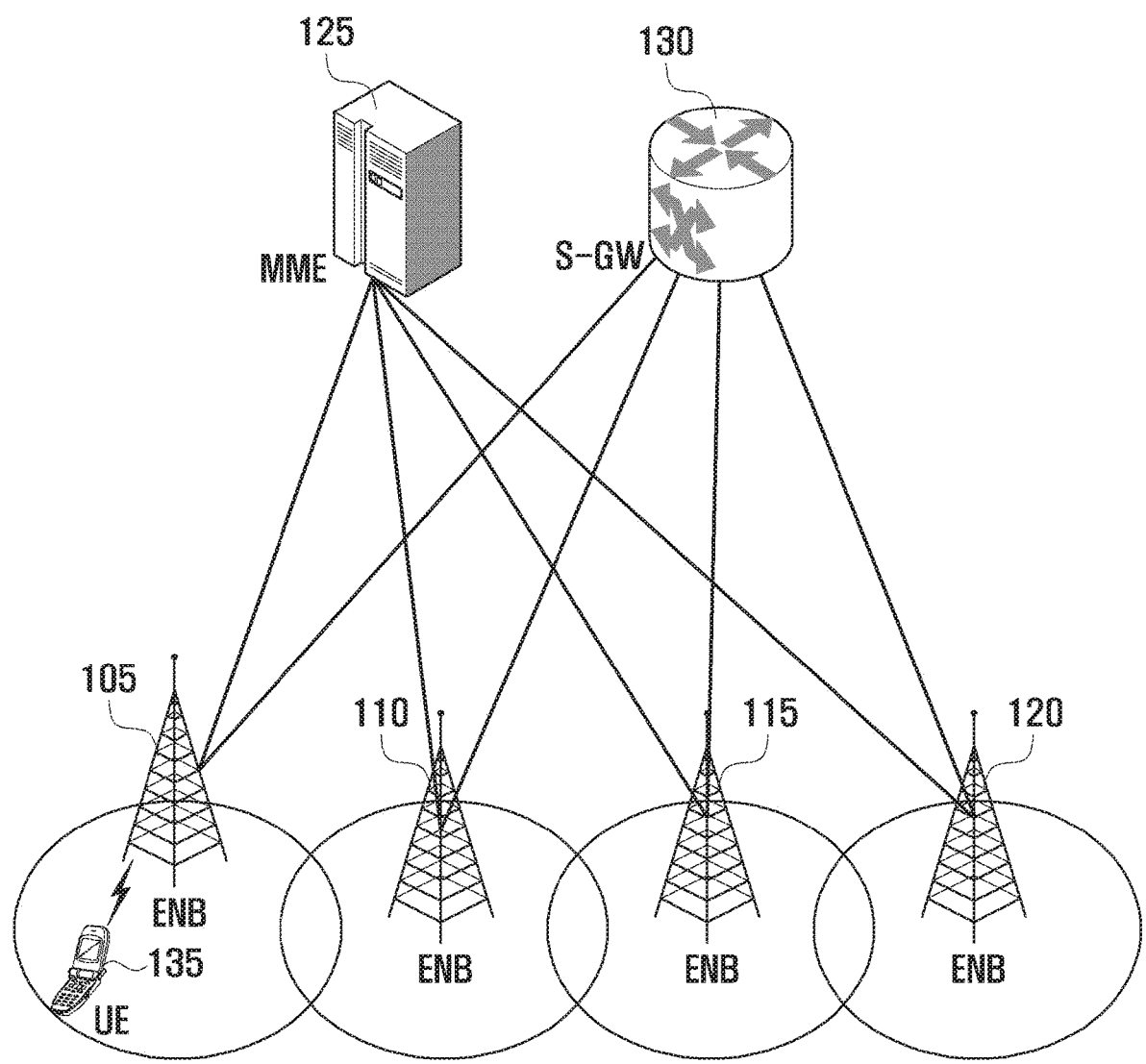
FIG. 1 illustrates the architecture of an LTE system according to an embodiment of the present invention.

Hereinafter, embodiments of the present invention are described in detail with reference to the accompanying drawings.

Descriptions of functions and structures well known in the art and not directly related to the present invention may be omitted to avoid obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The following description of embodiments of the present invention focuses on the LTE system. However, it should be understood that the subject matter of the present invention is also applicable to other communication systems permitting a user equipment to be handed over between different base stations.

FIG. 1 illustrates the architecture of an LTE system according to an embodiment of the present invention.

Referring to FIG. 1, the LTE radio access network is composed of base stations (Evolved Node Bs, ENBs) 105, 110, 115 and 120, a Mobility Management Entity (MME) 125, and a Serving-Gateway (S-GW) 130. A user equipment (UE)(or terminal) 135 may connect to an external network through the ENBs 105 to 120 and the S-GW 130.

In FIG. 1, the ENBs 105 to 120 correspond to Node Bs of the UMTS system, but perform more complex functions in comparison to existing Node Bs. The ENBs 105 to 120 may be connected to the UE 135 through wireless channels. In the LTE system, all user traffic including real-time services like VoIP (Voice over IP) services is served by shared channels. Hence, it is necessary to perform scheduling on the basis of collected status information regarding buffers, available transmit powers and channels of UEs. Each of the ENBs 105 to 120 performs this scheduling function. In most cases, each ENB controls multiple cells. To achieve a data rate of 100 Mbps in a 20 MHz bandwidth, the LTE system utilizes Orthogonal Frequency Division Multiplexing (OFDM) as radio access technology. The LTE system employs Adaptive Modulation and Coding (AMC) to determine the modulation scheme and channel coding rate according to channel states of UEs. The S-GW 130 creates and removes data bearers under the control of the MME 125. The MME 125 is connected to multiple ENBs and performs various control functions including mobility management for UEs.

Figure 2:
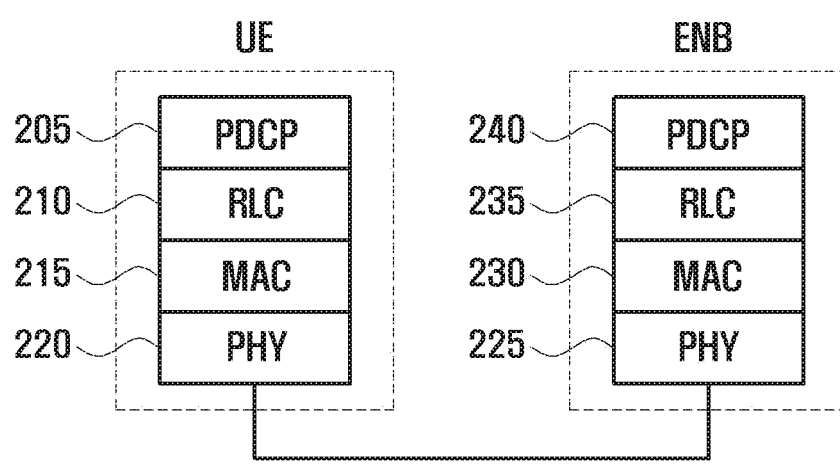
FIG. 2 illustrates a hierarchy of wireless protocols in the LTE system according to an embodiment of the present invention.

FIG. 2 illustrates a hierarchy of wireless protocols in the LTE system according to an embodiment of the present invention.

Referring to FIG. 2, in the LTE system, a UE and an ENB each include a wireless protocol stack composed of PDCP (Packet Data Convergence Protocol) 205 or 240, RLC (Radio Link Control) 210 or 235, MAC (Medium Access Control) 215 or 230, and a physical (PHY) layer 220 or 225.

The PDCP 205 or 240 performs compression and decompression of IP headers. The RLC 210 or 235 reconfigures PDCP PDUs (Protocol Data Unit) to a suitable size.

The MAC 215 or 230 forms connections between multiple RLC layer entities in a UE. The MAC 215 or 230 multiplexes RLC PDUs into MAC PDUs and demultiplexes MAC PDUs into RLC PDUs.

The PHY layer 220 or 225 converts higher layer data into OFDM symbols by means of channel coding and modulation and transmits the OFDM symbols through a wireless channel. The PHY layer 220 or 225 converts OFDM symbols received through a wireless channel into higher layer data by means of demodulation and channel decoding and forwards the data to higher layers. For additional error correction at the physical layer, Hybrid Automatic Repeat Request (HARQ) is used, and the receiver side transmits a 1-bit indication indicating whether it has received packets from the transmitter side. This information is referred to as HARQ ACK/NACK. Downlink HARQ ACK/NACK for uplink transmission may be transmitted via Physical Hybrid-ARQ Indicator Channel (PHICH). Uplink HARQ ACK/NACK for downlink transmission may be transmitted via Physical Uplink Control Channel (PUCC) or Physical Uplink Shared Channel (PUSCH).

Figure 3:
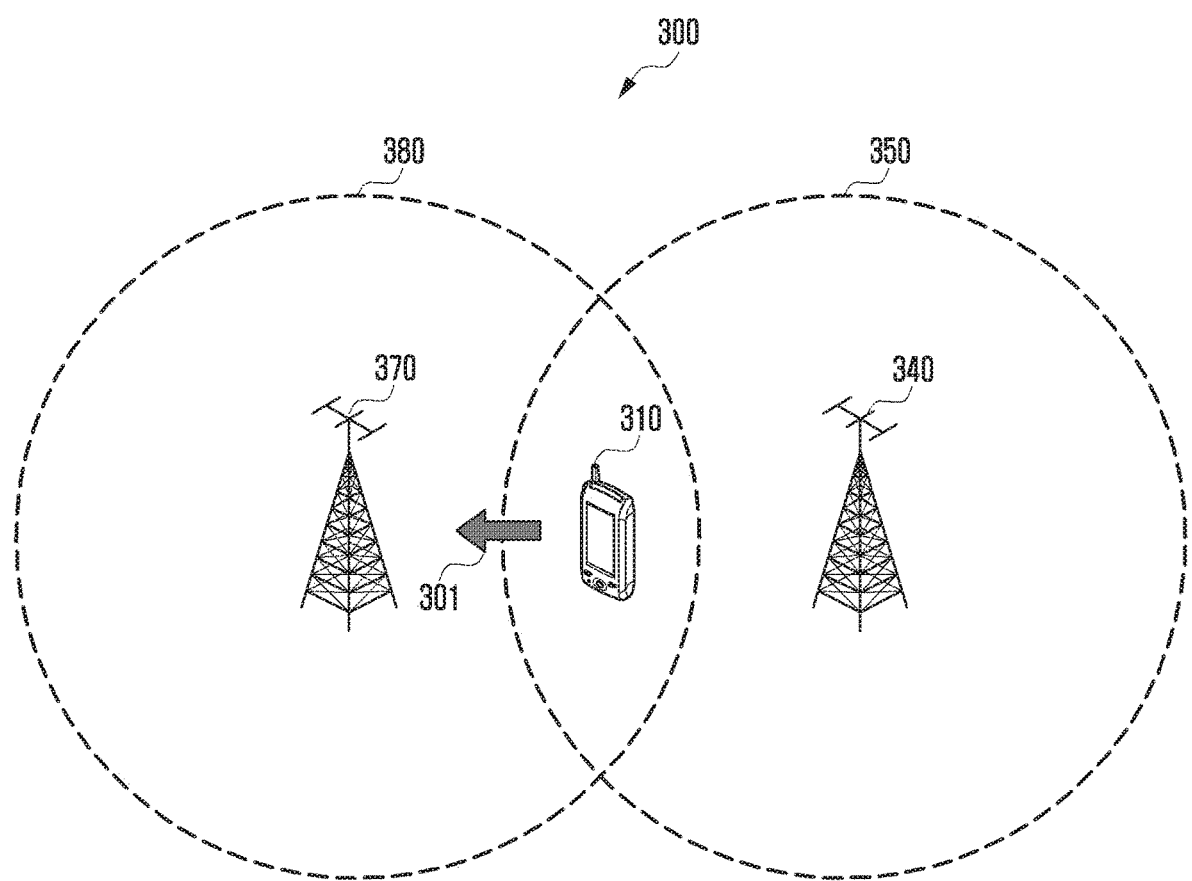
FIG. 3 illustrates a network configuration in a communication system according to an embodiment of the present invention.

FIG. 3 illustrates a network configuration in a communication system according to an embodiment of the present invention.

Referring to FIG. 3, the communication system may include a UE 310, a source ENB 340, and a target ENB 370. Initially, the UE 310 remains in the coverage 350 of the source ENB 340 and communicates through the source ENB 340. Thereafter, the UE 310 may leave the coverage 350 of the source ENB 340 and enter the coverage 380 of the target ENB 370 by moving in a direction indicated by indicia 301.

To prevent communication interruption when the UE 310 leaves the coverage 350 of the source ENB 340, base station switching is performed so that the UE 310 may continue communication through the target ENB 370 instead of the source ENB 340.

Among packets sent to the source ENB 340 during base station switching, those packets to be transmitted to the UE 310 may be forwarded to and stored in the target ENB 370.

The target ENB 370 may transmit the received and stored packets to the UE 310. As the target ENB 370 stores the packets first and then transmits the packets, the target ENB 370 may be described as buffering the packets. Alternatively, the target ENB 370 may receive the packets to be transmitted to the UE 310 from the core network.

Upon completion of base station switching, the UE 310 notifies this to the target ENB 370. For example, the UE 310 may send the target ENB 370 a message with a PDCP header in which one of the reserved (R) bits (CCA bit) is set to '1'. Upon reception of a message with a PDCP header, the target ENB 370 may analyze the PDCP header and be aware that base station switching is completed if the CCA bit of the PDCP header is '1'.

At this time, the target ENB 370 may determine the point in time at which the stored packets is to be transmitted to the UE 310. At the determined point in time, the target ENB 370 may transmit the buffered packets to the UE 310. The target ENB 370 may determine the point in time at which the buffered packets is to be transmitted to the UE 310 according to the properties of the packets. The procedure by which the target ENB 370 determines the point in time to transmit the buffered packets to the UE 310 is described later.

Figure 4:
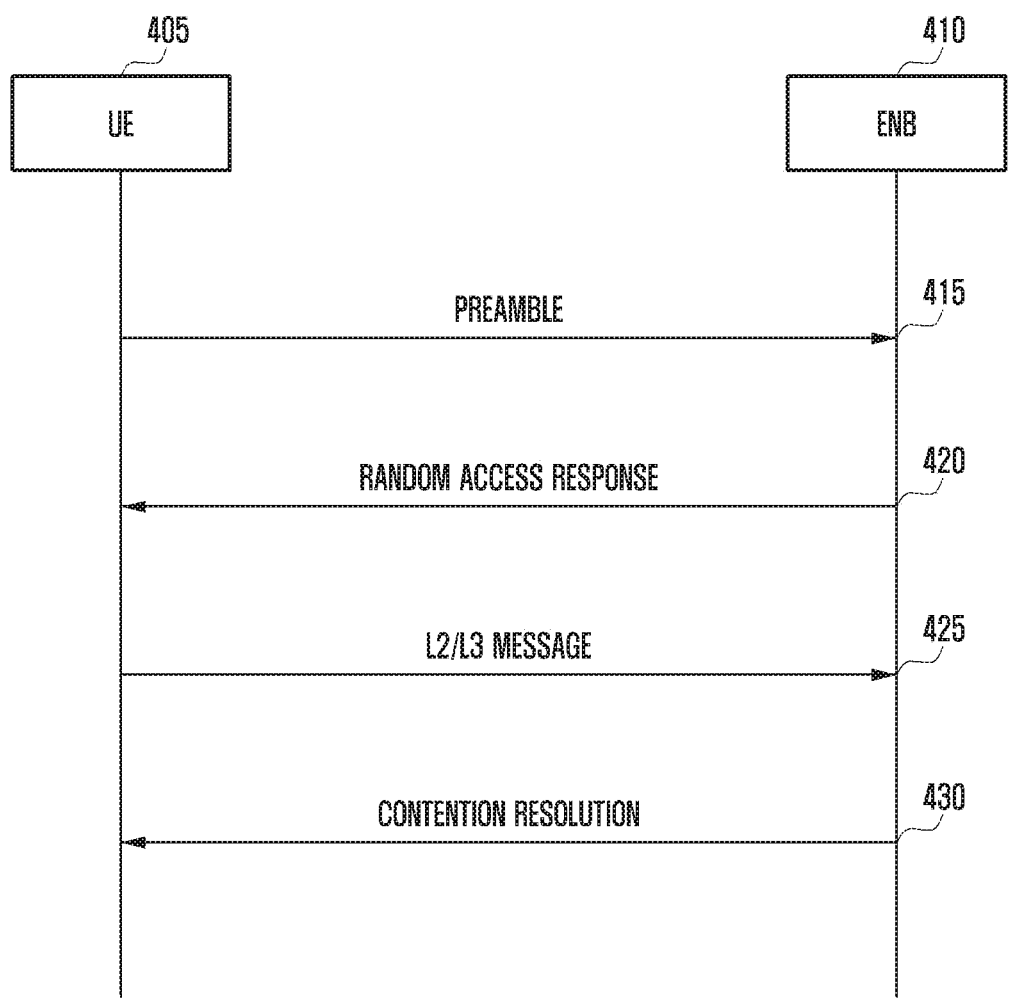
FIG. 4 illustrates a procedure for random access according to an embodiment of the present invention.

FIG. 4 illustrates a procedure for random access according to an embodiment of the present invention.

Referring to FIG. 4, the UE 405 may perform random access to the ENB 410. The random access procedure may include steps of sending a preamble, receiving a random access response, sending a L2/L3 message, and resolving contention. The last two steps may be skipped in some situations.

Random access may be performed when the UE remaining in the RRC_CONNECTED state and not in uplink synchronization has to send new uplink data or control information, when the UE remaining in the RRC_CONNECTED state and not in uplink synchronization has to send ACK/NACK for newly received downlink data, when the UE remaining in the RRC_CONNECTED state performs handover from the source cell to the target cell, when the UE transitions from the RRC_IDLE state to the RRC_CONNECTED state (e.g. initial attachment or tracking area update), or when the UE reenters the RRC_CONNECTED state after radio link failure. In the present embodiment, the UE performs random access for handover from a source cell to a target cell.

To perform random access due to a specific cause, the UE 405 may determine the preamble to be sent to the ENB 410, the point in time to send the preamble, and the transmission resource (frequency and time resources) to be used to send the preamble on the basis of information regarding random access transmission resources of the cell to which random access is attempted.

At step 415, the UE 405 sends a preamble using transmit power computed in consideration of the current channel conditions such as pathloss. More specifically, the initial transmit power for the preamble may be determined in consideration of pathloss. The UE 405 may estimate the pathloss using the average Reference Signal Received Power (RSRP) in the downlink. The UE 405 may determine the power offset on the basis of at least one of the desired SINR (Signal to Interference plus Noise Ratio), the level of uplink interference and noise measured at a time-frequency slot assigned to the RACH preamble, and the preamble shape.

At step 420, upon reception of the preamble from the UE 405, the ENB 410 generates a Random Access Response (RAR) message and sends the RAR message to the UE 405. The RAR message may contain at least one of Timing Advance (TA) for uplink transmission, Cell Radio Network Temporary Identifier (temporary C-RNTI), and Uplink grant (UL grant) for uplink transmission resources related to the L2/L3 message. More specifically, the RAR may be indicated by Random Access Radio Network Temporary Identifier (RA-RNTI) sent through the PDCCH. The UE 405 may identify the time-frequency slot at which the preamble is detected by use of the RA-RNTI. When the RAR is not received during a preset time window, the UE 405 may resend the preamble to the ENB 410.

At step 425, the UE 405 sends a L2/L3 message on the basis of information obtained from the RAR. The L2/L3 message may contain identity information of the UE 405. More specifically, the L2/L3 message may be the first scheduled uplink transmission on the PUSCH and may use Hybrid Automatic Repeat reQuest (HARQ). The UE 405 may use the L2/L3 message to transmit one or more random access messages including RRC connection request, tracking area update, and scheduling request. The L2/L3 message may also contain at least one of Temporary C-RNTI assigned by the RAR, C-RNTI, and 48-bit UE identity.

At step 430, the ENB 410 sends a contention resolution message as a reply to the L2/L3 message. This is often referred to as collision resolution. More specifically, the contention resolution phase enables identification of a particular UE whose preamble is recognized when the same preamble has been sent by multiple different UEs. If the ENB 410 fails to receive the preamble from the UE 405, it does not send a response message. Hence, the UE 405 fails to receive a response message. After a preset time has elapsed, the UE 405 may resend the preamble with increased transmit power through uplink power control.

As described above, random access may be initiated due to various causes. For example, random access may be initiated for sending a scheduling request, or RRC connection establishment or RRC connection reconfiguration. Random access may also be initiated at the target cell after handover. In these cases, it is preferable for the UE to initiate random access at the PCell. However, to establish the uplink transmission timing for a SCell, the UE should initiate random access at the SCell. Unlike random access initiation at the PCell, the ENB directly controls random access initiation at the SCell. That is, the ENB may control the SCell random access load at a suitable level and permit the UE to perform random access at a desired point in time by prohibiting the UE from arbitrarily initiating random access at the SCell.

Figure 5:
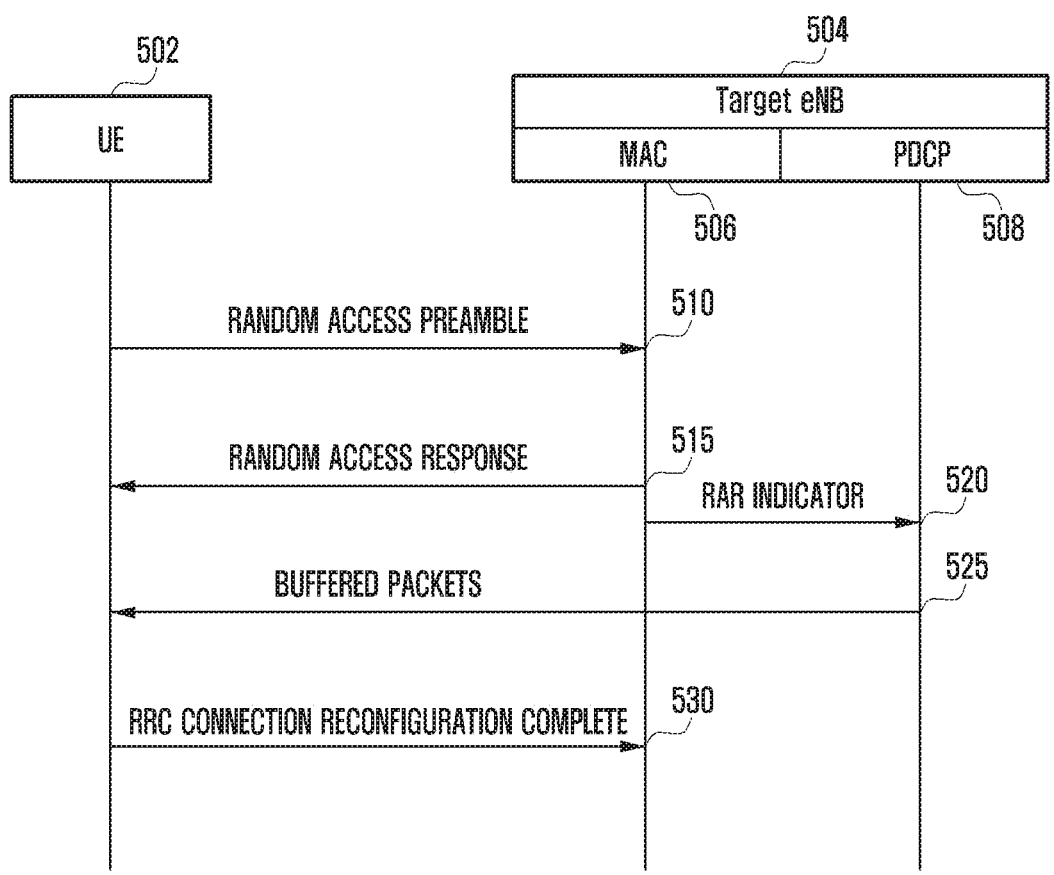
FIG. 5 illustrates a procedure for handover according to an embodiment of the present invention.

FIG. 5 illustrates a procedure for handover according to an embodiment of the present invention.

Referring to FIG. 5, signals may be exchanged between the UE 502 and the target ENB 504, and the target ENB 504 may include at least one of a MAC layer 506 and a PDCP layer 508. Here, it is assumed that the UE 502 is just handed over from a source ENB to the target ENB 504. The target ENB 504 may buffer UE data forwarded by the source ENB or the core network. For handover, additional messages (not shown in FIG. 5) may be exchanged between the UE 502 and the target ENB 504.

At step 510, for random access, the UE 502 sends a random access preamble to the MAC layer 506 of the target ENB 504. The random access preamble may be a dedicated preamble assigned to the UE 502.

Upon reception of the random access preamble, at step 515, the MAC layer 506 sends a random access response (RAR) message. The random access response message may contain information determined according to the details described in connection with FIG. 4.

At step 520, the MAC layer 506 forwards an RAR indicator to the PDCP layer 508. The RAR indicator may notify that the RAR message is transmitted to the UE 502.

In one embodiment, between step 510 or earlier and step 525 (before step 525), the source ENB or core network may forward data for the UE 502 to the target ENB 504, which may then buffer the forwarded data.

At step 525, the PDCP layer 508 sends the packets buffered for the UE 502 to the UE 502. The target ENB 504 may determine the UE to which buffered packets are to be transmitted on the basis of the random access preamble received at step 510.

At step 530, the UE 502 sends an RRC connection reconfiguration complete message to the MAC layer 506. Transmission of this message indicates completion of handover.

As described above, the target ENB 504 transmits buffered data to the UE 502 before receiving the message of step 530, preventing delay of data transmission due to handover. Hence, it is possible to enhance user convenience.

Figure 6:
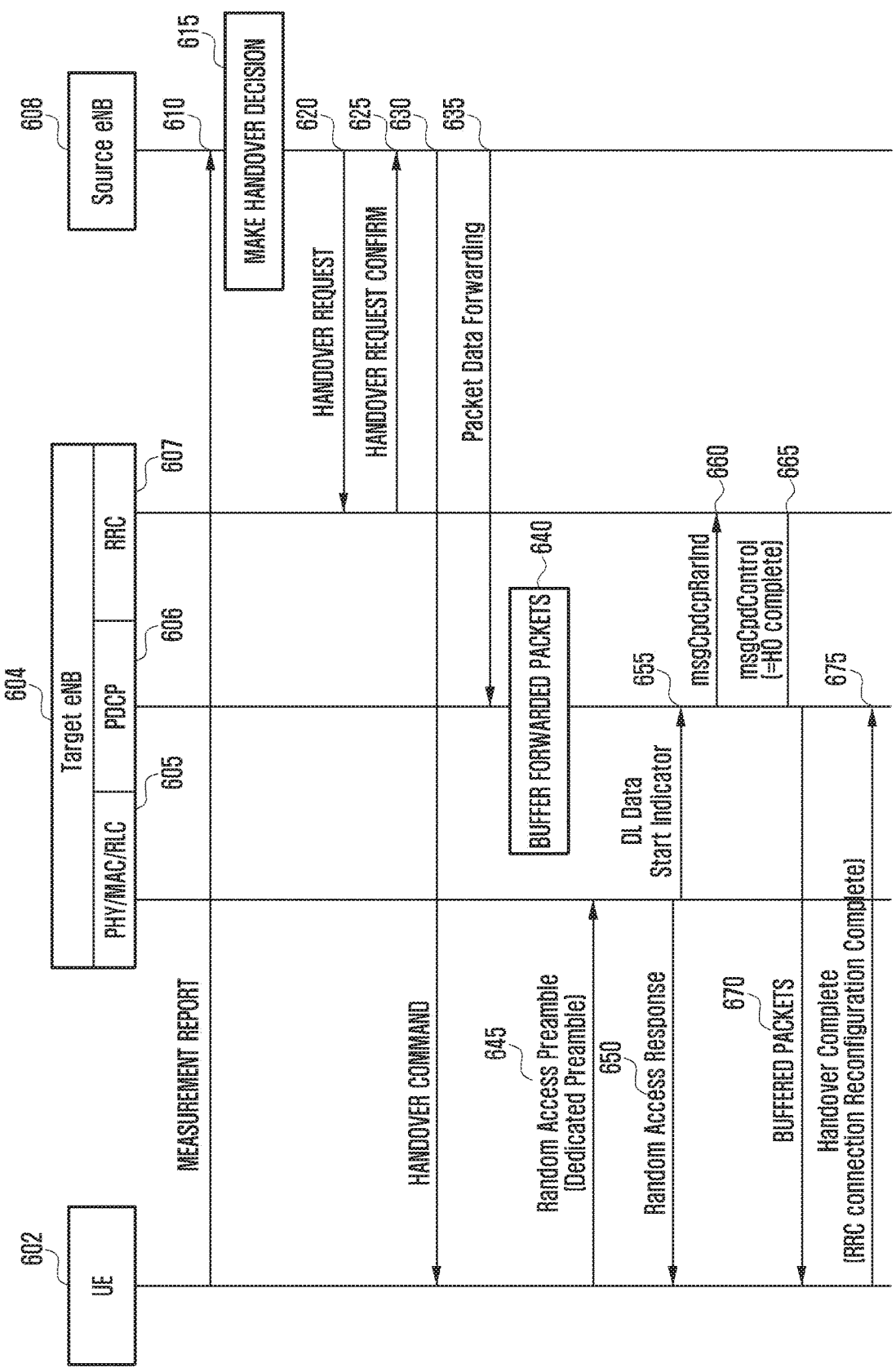
FIG. 6 illustrates a procedure for handover according to another embodiment of the present invention.

FIG. 6 illustrates a procedure for handover according to another embodiment of the present invention.

Referring to FIG. 6, signals may be exchanged among the UE 602, the target ENB 604, and the source ENB 608. The target ENB 604 may include at least one of a PHY/MAC/RLC layer 605 (referred to as MAC layer), a PDCP layer 606 and an RRC layer 607. Although the UE 602 and the source ENB 608 may each include one or more layers, they are represented as a single-layer node for ease of description.

At step 610, the UE 602 sends a measurement report to the source ENB 608. The UE 602 may measure the strength of signals received from the source ENB 608 and the target ENB 604 and report the measurement result to the source ENB 608.

At step 615, the source ENB 608 makes a handover decision for the UE 602 on the basis of the measurement report. For example, if the measured signal strength of the source ENB 608 is lower than that of the target ENB 604, the source ENB 608 may determine to handover the UE 602. The source ENB 608 may also determine to handover the UE 602 when considering that it is more advantageous for the UE 602 to communicate with the target ENB 604.

Upon determining to initiate handover, at step 620, the source ENB 608 sends a handover request message to the target ENB 604. Here, the handover request message may be transmitted to the RRC layer 607.

Upon reception of the handover request message, at step 625, the target ENB 604 allocates contexts and resources for the UE 602 and sends the source ENB 608 a handover request confirm message containing at least one of context allocation information and resource allocation information.

In one embodiment, at least one of the handover request message and the handover request confirm message may be sent as an RRC message.

At step 630, the source ENB 608 sends the UE 602 a handover command, which contains context and resource allocation information obtained from the target ENB 604 and a directive on base station switching to the target ENB 604.

At step 635, after sending the handover command, the source ENB 608 forwards, among packets received by the source ENB 608, those packets to be transmitted to the UE 602 to the target ENB 604. Those packets may be sent to the PDCP layer 606. For example, when the UE 602 is handed over during a call, packets associated with the call may be forwarded for the UE 602. When the UE 602 is handed over while downloading data through a wireless Internet connection, packets associated with the downloaded data may be forwarded for the UE 602. If necessary, packets associated with VoLTE (Voice over LTE) may also be forwarded to the target ENB 604. Alternatively, the source ENB 608 may initiate packet forwarding to the target ENB 604 upon reception of the handover request confirm message.

At step 640, the target ENB 604 buffers the received packets. That is, the target ENB 604 may temporarily store the forwarded packets before they are transmitted to the UE 602 (packet buffering).

At step 645, the UE 602 sends a random access preamble to the target ENB 604 on the basis of the received handover command Here, the random access preamble may be a dedicated preamble and may be sent to the MAC layer 605 of the target ENB 604. The random access preamble may be sent through a shared channel In one embodiment, upon reception of the random access preamble, the target ENB 604 may perform resource allocation for the UE 602.

At step 650, the target ENB 604 sends the UE 602 a random access response corresponding to the random access preamble. The random access response may contain information enabling the UE 602 to communicate with the target ENB 604 such as resource allocation information.

At step 655, in the target ENB 604 as a response to reception of the random access preamble, the MAC layer 605 sends a data transmission start indicator to the PDCP layer 606, causing the PDCP layer 606 to transmit packets buffered for the UE 602 to the UE 602. Alternatively, as a response to reception of the random access response, the MAC layer 605 of the target ENB 604 may send the data transmission start indicator to the PDCP layer 606. In other words, the data transmission start indicator may be sent to the PDCP layer 606 after reception of the random access preamble.

At step 660, the PDCP layer 606 sends a message notifying handover completion to the RRC layer 607. This message may be a msgCpdcpRarInd message.

At step 665, the RRC layer 607 sends a message notifying handover completion to the PDCP layer 606. This message may be a msgCpdcpControl message.

At step 670, the target ENB 604 transmits packets buffered for the UE 602 to the UE 602. Here, data buffered at the PDCP layer 606 may be transmitted to the UE 602. The PDCP layer 606 may initiate transmission of buffered packets to the UE 602 upon reception of the data transmission start indicator at step 655. Hence, the UE 602 may receive the buffered data before sending a handover complete message. The UE 602 may start preparation for receiving buffered data from the target ENB 604 upon reception of the random access preamble or the random access response. The UE 602 may also receive buffered packets from the target ENB 604 without separate preparation.

At step 675, the UE 602 sends a message notifying handover completion to the target ENB 604. This message may be a handover complete message, and transmission of the handover complete message may correspond to completion of RRC connection reconfiguration.

As described above, in one embodiment, the target ENB 604 may receive a random access preamble from the UE 602, send a random access response as a reply to the UE 602, and initiate transmission of packets buffered for the UE 602 after reception of the random access preamble and transmission of the random access response.

The target ENB 604 may initiate transmission of packets buffered for the UE 602 before receiving the handover complete message, and the UE 602 may receive the buffered packets from the target ENB 604 before sending the handover complete message to the target ENB 604.

As described above, the target ENB 604 may transmit packets buffered for the UE 602 to the UE 602 before receiving the handover complete message. Thereby, it is possible to reduce delay of data forwarding due to handover, decreasing latency.

Figure 7:
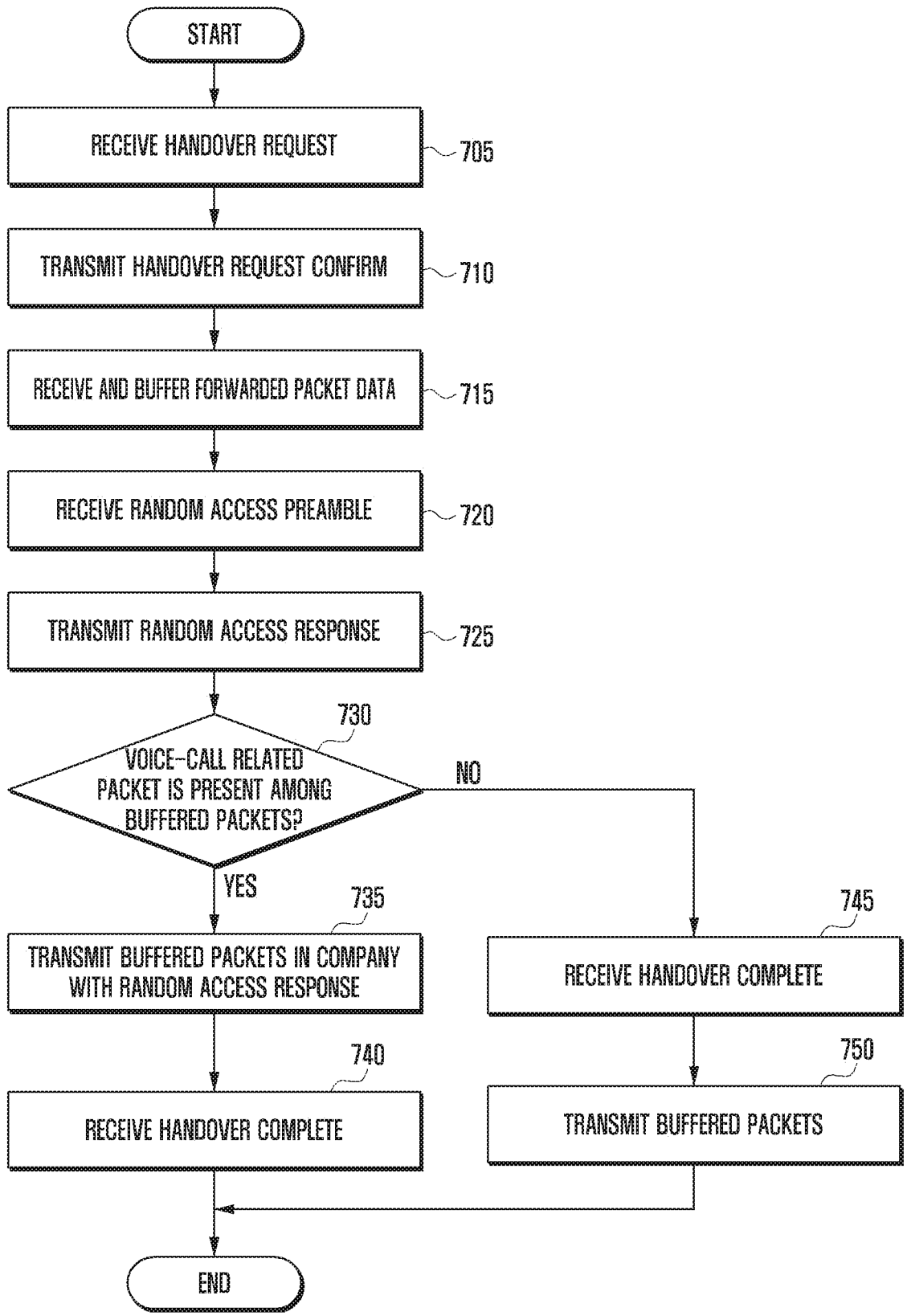
FIG. 7 illustrates operations of the target base station according to an embodiment of the present invention.

FIG. 7 illustrates operations of the target base station according to an embodiment of the present invention.

Referring to FIG. 7, the target ENB may send and receive signals to and from at least one of the source ENB and the UE.

At step 705, the target ENB receives a handover request message from the source ENB. The handover request message may contain information on a UE to be handed over.

At step 710, the target ENB sends a handover request confirm message to the source ENB. Here, the target ENB may allocate contexts and resources for the UE and send the source ENB a handover request confirm message containing at least one of context allocation information and resource allocation information.

At step 715, the target ENB receives and buffers packets forwarded by the source ENB or core network for the UE. The forwarded packets may be temporarily stored in the target ENB.

At step 720, the target ENB receives a random access preamble from the UE being handed over. Here, the random access preamble may be a dedicated preamble for the UE. The random access preamble may be sent through a shared channel. In one embodiment, upon reception of the random access preamble, the target ENB may perform resource allocation for the UE.

Upon reception of the random access preamble, at step 725, the target ENB sends a random access response to the UE. The random access response may contain information enabling the UE to communicate with the target ENB such as resource allocation information.

At step 730, the target ENB determines whether a voice-call related packet is present among the buffered packets for the UE. Specifically, the target ENB may check whether a VoLTE related packet is present among the buffered packets for the UE. In one embodiment, this determination may be made after receiving the forwarded packets at step 715. Step 730 may be selectively performed in some cases. When step 730 is skipped, the procedure proceeds directly to step 735. If a voice-call related packet is present among the buffered packets, the procedure proceeds to step 735. Otherwise, the procedure proceeds to step 745.

At step 735, the target ENB transmits the buffered packets to the UE in company with transmission of the random access response. The target ENB may also transmit the buffered packets to the UE in reply to reception of the random access preamble. Alternatively, when forwarded packets for the UE being handed over are buffered in the target ENB and a random access preamble is received from the UE, the target ENB may transmit the forwarded packets to the UE.

At step 740, the target ENB receives a handover complete message from the UE. In one embodiment, when a voice-call related packet is present among the buffered packets, the target ENB may start to transmit the buffered packets to the UE before receiving the handover complete message. Thereby, it is possible to reduce the latency of data forwarding due to handover. In particular, when a UE receiving a VoLTE service is handed over, a small increment in the latency may significantly degrade the quality of service for the user. As such, the reduced latency can enhance user convenience.

At step 745, the target ENB receives a handover complete message from the UE. Upon reception of the handover complete message, at step 750, the target ENB transmits the buffered packets to the UE.

Figure 8:
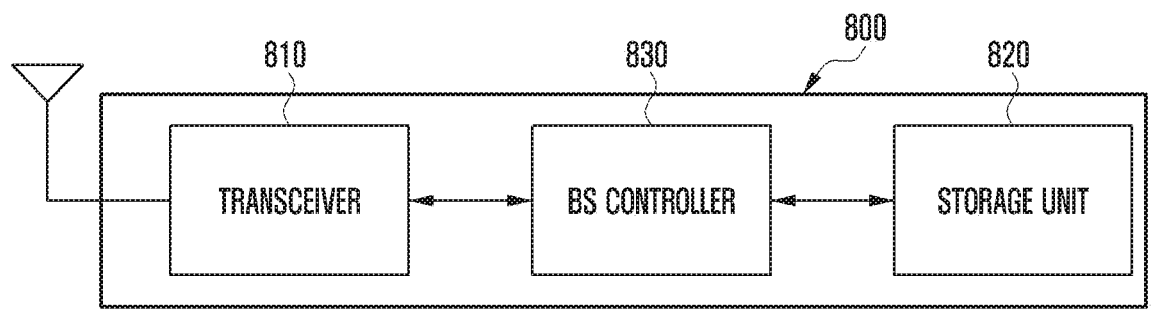
FIG. 8 is a block diagram of a base station according to an embodiment of the present invention.

FIG. 8 is a block diagram of a base station (BS or ENB) according to an embodiment of the present invention.

Referring to FIG. 8, the ENB 800 may include a transceiver unit 810 to send and receive signals to and from a UE or another ENB, a storage unit 820 to store sent and received data and/or data needed for operation of the ENB 800, and a BS control unit 830 to control the transceiver unit 810 and storage unit 820 and to control the overall operation of the ENB 800. The ENB 800 may operate as a target ENB and/or a source ENB.

The transceiver unit 810 may send and receive signals to and from a UE and/or another ENB. The transceiver unit 810 may include a transmitter to send a signal, and a receiver to receive a signal.

More specifically, the BS control unit 830 may receive a measurement report from a UE and determine whether to handover the UE on the basis of the measurement report. The BS control unit 830 may send or receive a handover request message and a handover request confirm message. Upon determining to handover the UE, the BS control unit 830 may send a handover command message to the UE, send and receive packets for the UE to and from another ENB, and buffer received packets for the UE. The BS control unit 830 may receive a random access preamble from the UE, send a random access response as a reply to the UE, and transmit buffered packets to the UE before or without receiving a handover complete message from the UE. The BS control unit 830 may receive a handover complete message from the UE having completed handover.

The BS control unit 830 may control one of the PHY/MAC/RLC layer, the PDCP layer, and the RRC layer. When the RLC layer receives a random access preamble from the UE, the BS control unit 830 may control the RLC layer to send a buffered data transmission start indicator to the PDCP layer in accordance with the random access preamble and/or the random access response. Upon reception of the buffered data transmission start indicator, the PDCP layer may transmit buffered data to the UE.

The BS control unit 830 may control operations of the ENB 800 according to the embodiments described before.

Figure 9:
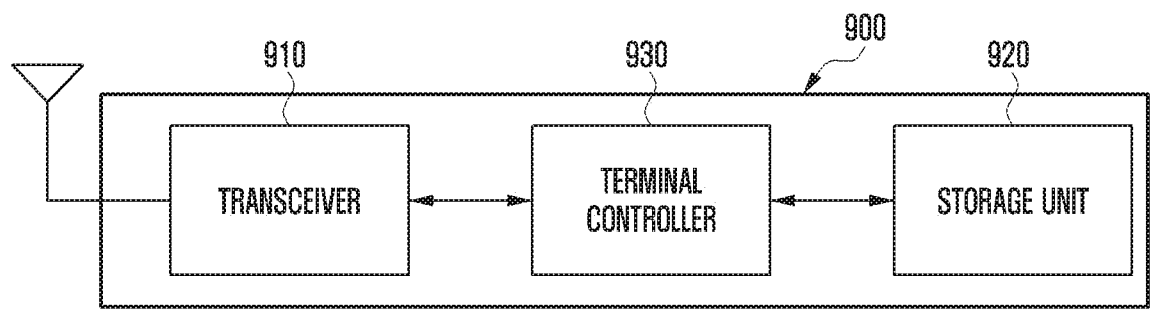
FIG. 9 is a block diagram of a user equipment according to an embodiment of the present invention.

FIG. 9 is a block diagram of a user equipment (terminal or UE) according to an embodiment of the present invention.

Referring to FIG. 9, the UE 900 may include a transceiver unit 910 to send and receive signals to and from an ENB, a storage unit 920 to store sent and received data and/or data needed for operation of the UE 900, and a terminal control unit 930 to control the transceiver unit 910 and storage unit 920 and to control the overall operation of the UE 900.

The transceiver unit 910 may send and receive signals to and from an ENB. The transceiver unit 910 may include a transmitter to send a signal, and a receiver to receive a signal.

More specifically, the terminal control unit 930 may generate a measurement report based on the result of measurement on signals received from the source and target ENBs, send the measurement report to the source ENB, and receive a handover command message from the source ENB as a reply. The terminal control unit 930 may send a random access preamble to the target ENB, and receive a random access response from the target ENB as a reply. The terminal control unit 930 may receive buffered packets, which have been forwarded to the target ENB, from the target ENB. The terminal control unit 930 may send a handover complete message indicating handover completion to the target ENB. In particular, the UE 900 may receive packets forwarded owing to handover from the target ENB before the handover complete message is received by the target ENB.

The terminal control unit 930 may control operations of the UE 900 according to the embodiments described before.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method for a target base station to support handover of a terminal in a mobile communication system, the method comprising:
   receiving, from the terminal, a random access preamble;
   transmitting, to the terminal, a random access response in response to the receiving of the random access preamble;
   transmitting an indicator indicating initiation of a transmission of a stored packet for the terminal from a medium access control (MAC) layer of the target base station to a packet data convergence protocol (PDCP) layer of the target base station, in response to at least one of the transmitting of the random access preamble and the receiving of the random access preamble, wherein the stored packet is received from a source base station;
   initiating, by the PDCP layer, the transmission of the stored packet based on the indicator; and
   receiving, from the terminal, a handover complete message.

2. The method of claim 1, wherein the stored packet includes the packet related to a voice call.

3. The method of claim 1, wherein the random access preamble includes a dedicated preamble for allocating a resource to the terminal in response to the receiving of the random access preamble.

4. A method for handover of a terminal in a mobile communication system, the method comprising:
   transmitting, to a target base station, a random access preamble;
   receiving, from the target base station, a random access response in response to the random access preamble; and
   receiving, from the target base station, a stored packet for the terminal, wherein the stored packet is received from a source base station by the target base station; and
   transmitting, to a target base station, a handover complete message,
   wherein a medium access control (MAC) layer of the target base station transmits, to a packet data convergence protocol (PDCP) layer of the target base station, an indicator indicating initiation of a transmission of the stored packet, in response to at least one of the transmitting of the random access preamble and the receiving of the random access preamble, and
   wherein the stored packet is received, in response to initiating, by the PDCP layer, the transmission of the stored packet based on the indicator, before the transmitting of the handover complete message.

5. The method of claim 4, wherein the stored packet includes a packet related to a voice call.

6. The method of claim 4, wherein the random access preamble includes a dedicated preamble for allocating a resource to the terminal in response to the receiving of the random access preamble.

7. A target base station supporting handover of a terminal in a mobile communication system, comprising:
   a transceiver; and
   a controller coupled with the transceiver and configured to:
   receive, from the terminal, a random access preamble,
   transmit, to the terminal, a random access response in response to the receiving of the random access preamble,
   receive, from the terminal, a random access preamble;
   transmit, to the terminal, a random access response in response to the receiving of the random access preamble,
   transmit an indicator indicating initiation of a transmission of a stored packet for the terminal from a medium access control (MAC) layer of the target base station to a packet data convergence protocol (PDCP) layer of the target base station, in response to at least one of the transmitting of the random access preamble and the receiving of the random access preamble, wherein the stored packet is received from a source base station,
   initiate, by the PDCP layer, the transmission of the stored packet based on the indicator, and
   receive, from the terminal, a handover complete message.

8. The target base station of claim 7, wherein the stored packet includes the packet related to a voice call.

9. The target base station of claim 7, wherein the random access preamble includes a dedicated preamble for allocating a resource to the terminal in response to the receiving of the random access preamble.

10. A terminal capable of handover in a mobile communication system, comprising:
a transceiver; and
a controller coupled with the transceiver and configured to:
transmit, to a target base station, a random access preamble,
receive, from the target base station, a random access response in response to the receiving of the random access preamble, and
receive, from the target base station, a stored packet for the terminal, wherein the stored packet is received from a source base station by the target base station, and
transmit, to a target base station, a handover complete message,
wherein a medium access control (MAC) layer of the target base station transmits, to a packet data convergence protocol (PDCP) layer of the target base station, an indicator indicating initiation of a transmission of the stored packet, in response to at least one of the transmitting of the random access preamble and the receiving of the random access preamble, and
wherein the stored packet is received, in response to initiating, by the PDCP layer, the transmission of the stored packet based on the indicator, before the transmitting of the handover complete message.

11. The terminal of claim 10, wherein the stored packet includes the packet related to a voice call.

12. The terminal of claim 10, wherein the random access preamble includes a dedicated preamble for allocating a resource to the terminal in response to the receiving of the random access preamble.

\* \* \* \* \*